Oct. 5, 1926.

S. W. GOOCH ET AL 1,602,012

GLASS MOLD

Filed Feb. 3, 1926      3 Sheets-Sheet 1

*Fig. 1*

Shay W. Gooch
William K. Yonge
Inventor

By William L. Symons
Their Attorney

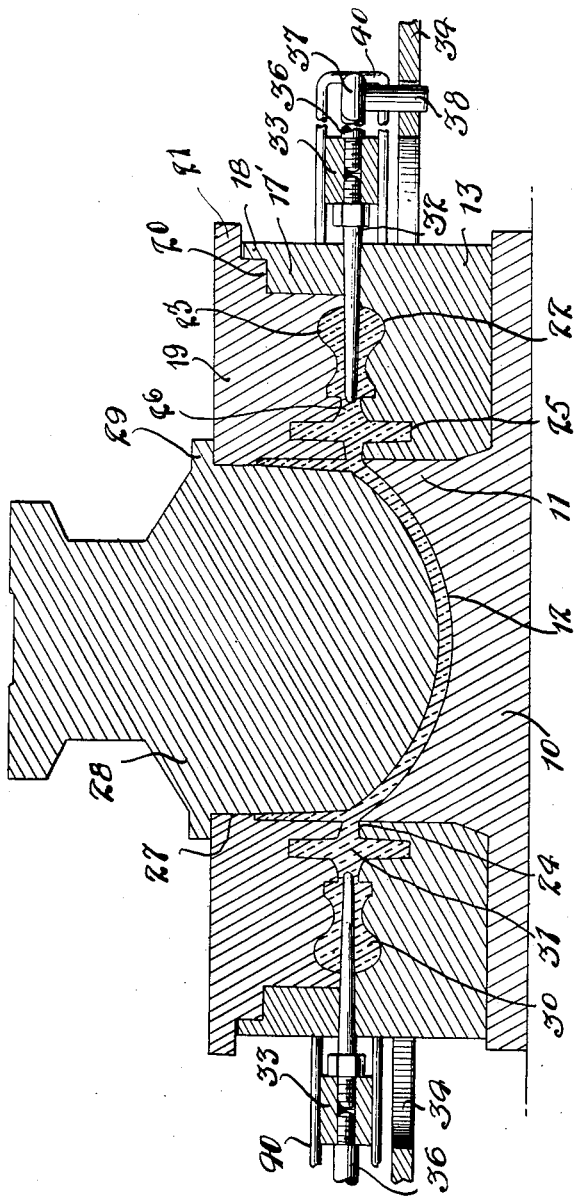

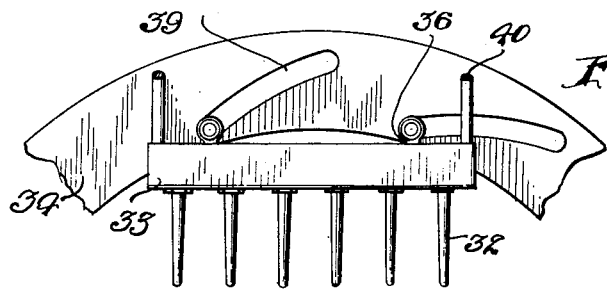
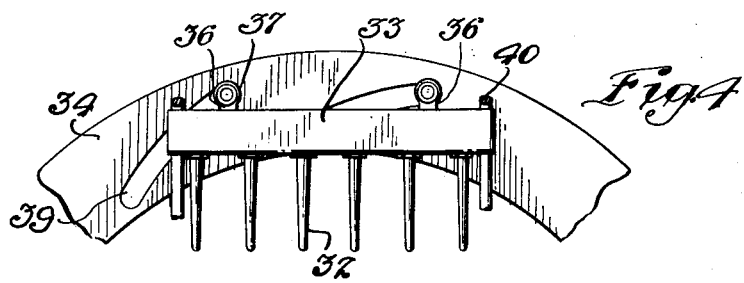
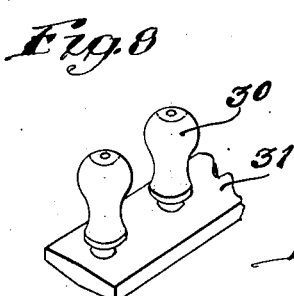
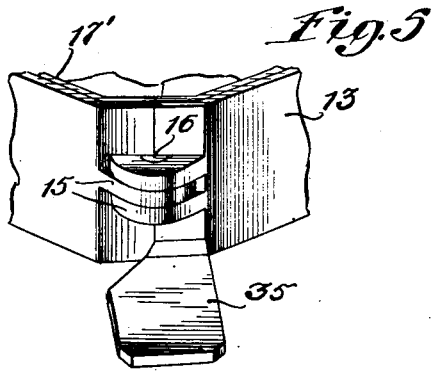
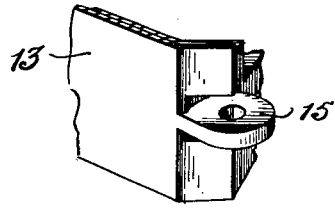
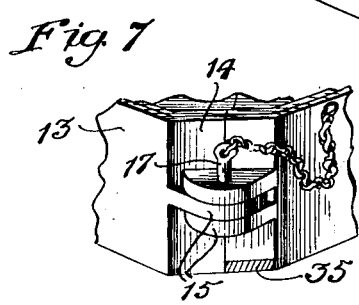

Patented Oct. 5, 1926.

1,602,012

UNITED STATES PATENT OFFICE.

SHAY W. GOOCH AND WILLIAM KENTON YONGE, OF IRWIN, PENNSYLVANIA.

GLASS MOLD.

Application filed February 3, 1926. Serial No. 85,742.

Our invention relates to improvements in molds and more especially to glass molds of the type used to form knobs for furniture, doors, and the like, although not necessarily restricted to this use.

An important object of our invention is the provision of a device of the above mentined character which is capable of forming knobs of the kind above referred to in large quantities at a time and of a better quality than have heretofore been produced.

Another object of our invention is to provide a mold for producing glass knobs connected to a suitable boxing or support to facilitate polishing, finishing, and the like.

A further object of our invention is the provision, in a mold of the character above referred to, of improved means for forming openings in the molded articles.

A still further object of our invention is to provide a mold of this character which is easily taken apart and put together and which is of the simplest construction and operation.

Other objects and advantages of our invention will be apparent during the course of the following description.

In the accompanying drawings, which form a part of this specification and wherein the characters of reference denote like or corresponding parts throughout the same.

Figure 1 is a top plan view of the mold with the top section and plunger removed, Figure 2 is a central vertical sectional view of the complete mold, parts being broken away, Figure 3 is a detail view of the pin drawing mechanism in extended position, Figure 4 is a similar view of the withdrawn position, Figures 5, 6, and 7, are detail perspective views of the hinged portions of the mold sections, and Figure 8 is a detail perspective of a portion of the knob carrying boxing.

In the drawings, wherein for the purpose of illustration is shown a preferred embodiment of our invention, the numeral 10 designates the base of the mold having a raised central portion 11 which is square in cross section and has its upper end scooped out to form a cup-like depression 12 for the molten glass. The base 11 supports a plurality of mold sections 13, four being illustrated, the sections being connected together to form a square which fits closely about the raised portion 11 of the base. These sections are preferably hingedly connected at their ends to allow them to be readily separated from the base. The corners of the sections are beveled at 14 and are provided with interfitting ears 15 which are connected by a pivot pin 16. Suitable means may be provided for allowing separation of one of the joints to facilitate removal of the sections, such as the removable pin 17 shown in Figure 7 which takes the place of the pivot pin 16 in this joint.

The outer edges of the sections 13 are provided with upstanding rails 17' which are provided at their top portions with suitable vertically extending flanges 18. A square top or ring portion 19 corresponds to the general shape of the mold sections 13 and fits thereon, within the rails 17' and having a stepped portion 20 fitting on top of the rail, the top of the section 19 being extended out to form a horizontal flange 21 which projects beyond the outer edges of the mold sections 13.

Each mold section 13 has a series of depressions 22 for forming the knob or other article to be molded, there being similar complementary depressions 23 in the top ring 19, the two when together forming the complete knobs. Founts or glass openings 24 extend for the greater portion of the length of the sections 13 and communicate with the glass receptacle 12. These founts are preferably formed between the sections 13 and top 19. Between the fount openings 24 and the knob forming depressions and communicating with both, are depressions or grooves 25 which have considerable depth, there being a groove in each of the sections and corresponding grooves in the top ring 19 as shown in Figure 2. These grooves are connected to each of the mold depressions by means of a passage 26.

The top ring 19 is provided adjacent its upper edge with an inwardly extending flange-like portion 27 which forms a square opening for the reception of the plunger or piston 28 which has its lower end of a shape to correspond with and fit in the glass receptacle 12. The upper end of the plunger is provided with flanges 29 to limit the downward movement thereof by engaging the top ring 19.

It will be seen that the knob molding depressions are arranged horizontally and in four series, there being a series to each of the sections 13. There are six knobs illustrated to a series, making twenty-four knobs to each molding operation. The fount openings 24 are arranged above the level of the molten glass when the plunger is raised, and when the plunger is brought down, the hottest glass will be forced through the founts 24 to form the knobs 30 which when completed will be attached to the boxing or support 31. To remove the knobs from the mold, the top ring 19 is removed, and the upper portions of the boxings may then be grasped by suitable tongs or the like. When the knobs have been removed, the sections are removed, and the glass may then be knocked out of the receptacle 12. The boxing 31 serves as a support for the knobs during polishing or finishing, as illustrated in Figure 8.

In order to form the necessary openings in the knobs, we provide the following mechanism. Pins 32, tapering toward their ends, are attached to draw bars 33 arranged at the sides of the sections 13 and extend through said sections into the knob forming depressions 22 and 23, there being a pin for each knob, and arranged centrally thereof. A cam ring 34 surrounds the mold sections 13 and is supported on suitable lugs 35 carried by the sections, or by the hinge ears 15, or otherwise conveniently located. Each of the draw bars 33 is provided with a pair of pins 36 having eyes 37 for the reception of rollers 38 which extend through cam slots 39 in the cam ring 34. Suitable guides 40 for the draw bars 33 are secured to the sections 13 and prevent displacement of the draw bars. A suitable handle 41 is secured to the cam ring to facilitate the operation thereof.

When the molding operation is begun, the pins are in their extended position as shown in Figures 1, 2, and 3. The glass flows around the pins to form central openings in the knobs, and when the glass has cooled the cam ring is turned, drawing the draw bar 33 away from the sections by the action of the cam slots 39 on the rollers 38, thereby withdrawing the pins from the knobs as shown in Figure 4.

It will be seen from the foregoing, that we have provided a mold with numerous advantages over the molds of the prior art. By our construction only the hottest glass reaches the knob forming depressions which insures perfect knobs. A large quantity of good quality knobs are thus formed by a single operation, and the construction of the mold is such as to be easily operated and assembled, as well as inexpensively manufactured.

While we have shown and described the preferred embodiment of our invention it is to be understood that various changes in the size, shape, and arrangement of parts may be resorted to without departing from the spirit of our invention or the scope of the subjoined claims.

Having described our invention, what we claim and desire to protect by Letters Patent is:

1. A glass mold comprising a plurality of mold sections pivotally connected at their ends, a series of article forming depressions in each of said sections, a glass receptacle arranged between said sections, grooves arranged in said sections adjacent the depressions and communicating therewith, and means to force the glass from the receptacle to the grooves and depressions, whereby a plurality of series of articles will be formed, each series being connected to a boxing formed by the grooves.

2. A glass mold comprising a plurality of pivotally connected mold sections, arranged in polygonal formation, each side of the polygon being formed by one section, a polygonally shaped ring fitting over said sections, a series of article forming depressions arranged in each section, a glass receptacle arranged between the sections, a groove arranged in each section between the depressions and the glass receptacle and communicating with both, and means to force the glass into the depressions and grooves to form a plurality of series of articles at one operation, each series being connected to a boxing formed by the grooves.

3. A glass mold comprising a base having a centrally arranged raised portion polygonal in cross section, the upper surface of which is scooped out to form a glass receptacle, a plurality of hingedly connected mold sections arranged in polygonal formation and resting on the base, fitting closely about the raised portion thereof, there being a section for each side of the raised portion of the base, a polygonally shaped top ring arranged on said sections, a plurality of article forming depressions in each of said sections, a groove arranged in each of said sections, between the depressions and the glass receptacle and communicating with each, the greater portion of the glass receptacle being arranged below the depressions, and means to force the glass from the receptacle to the depressions and grooves, whereby a plurality of series of articles will be formed at one operation each series being connected to a boxing formed by the grooves.

4. A glass mold comprising a plurality of mold sections arranged in polygonal formation and hingedly connected at their ends, article forming depressions in said mold sections, draw bars arranged adjacent said mold sections, there being a bar for each section, pins carried by said bars and extending through the sections and into the article forming depressions, and a cam ring arranged about said mold sections and having cam slots engaging the draw bars, whereby when the cam ring is moved, the pins will be withdrawn from the article forming depressions.

5. A glass mold comprising a base having a centrally arranged raised portion polygonal in cross section, the upper surface of which is scooped out to form a glass receptacle, a plurality of mold sections arranged in polygonal formation and resting on the base, fitting closely about the raised portion thereof, there being a section for each side of the raised portion of the base, the sections being hingedly connected at their ends, a polygonally shaped top ring arranged on said sections, a plurality of article forming depressions in each of said sections and communicating with the glass receptacle, means to force glass into the depressions, draw bars arranged adjacent the mold sections, pins carried by said draw bars and extending into the depressions, a cam ring surrounding the sections and having cam slots, and roller elements carried by the draw bars and engaging the cam slots whereby when the cam ring is rotated the pins will be withdrawn from the article forming depressions.

In testimony whereof we affix our signatures.

SHAY W. GOOCH.
WILLIAM KENTON YONGE.